United States Patent
Ghosh

(10) Patent No.: US 11,645,156 B1
(45) Date of Patent: May 9, 2023

(54) UPDATING ERROR POLICY

(71) Applicant: Hewlett Packard Enterprise Development LP, Houston, TX (US)

(72) Inventor: Debdipta Ghosh, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/586,909

(22) Filed: Jan. 28, 2022

(51) Int. Cl.
*G06F 11/14* (2006.01)

(52) U.S. Cl.
CPC .................. *G06F 11/1417* (2013.01)

(58) Field of Classification Search
CPC .................................................. G06F 11/1417
See application file for complete search history.

(56) References Cited

U.S. PATENT DOCUMENTS

| | | | | |
|---|---|---|---|---|
| 6,487,464 B1 * | 11/2002 | Martinez | ............ | G06F 11/1417 714/36 |
| 7,120,559 B1 * | 10/2006 | Williams | ............ | G06F 11/0706 702/185 |
| 7,200,525 B1 * | 4/2007 | Williams | ............ | G06F 11/008 714/E11.02 |
| 7,203,881 B1 * | 4/2007 | Williams | ............ | G06F 11/261 714/33 |
| 7,379,846 B1 * | 5/2008 | Williams | ............ | G06F 11/079 714/25 |
| 7,516,025 B1 * | 4/2009 | Williams | ............ | G05B 23/0278 702/182 |
| 7,586,788 B2 | 9/2009 | Mawatari et al. | | |
| 8,064,259 B2 | 11/2011 | Lee et al. | | |
| 8,163,150 B2 | 4/2012 | Vann et al. | | |
| 8,225,032 B2 | 7/2012 | Kim | | |
| 8,229,999 B2 | 7/2012 | Devarakonda et al. | | |
| 8,713,350 B2 * | 4/2014 | Walton | ............... | G06F 11/0766 714/48 |
| 8,775,210 B2 | 7/2014 | Bao et al. | | |
| 8,929,115 B2 | 1/2015 | Kohli | | |
| 9,684,554 B2 * | 6/2017 | Candea | ............... | G06F 11/1666 |
| 10,410,366 B2 | 9/2019 | Michielin et al. | | |
| 11,507,444 B1 * | 11/2022 | Hamlin | ............... | G06F 11/1016 |
| 2002/0095625 A1 * | 7/2002 | Ahrens | ............... | G06F 11/006 714/E11.026 |
| 2004/0181708 A1 * | 9/2004 | Rothman | ............. | G06F 11/0793 714/10 |
| 2005/0229039 A1 * | 10/2005 | Anderson | ............ | G06F 11/1417 714/E11.134 |
| 2014/0201565 A1 * | 7/2014 | Candea | ............... | G06F 11/2069 714/15 |
| 2016/0049197 A1 | 2/2016 | Park et al. | | |

(Continued)

FOREIGN PATENT DOCUMENTS

| | | | | |
|---|---|---|---|---|
| EP | 2510439 B1 * | 5/2022 | .......... | G06F 11/0712 |
| WO | 2006/108227 A1 | 10/2006 | | |

*Primary Examiner* — Joseph O Schell
*Assistant Examiner* — Indranil Chowdhury
(74) *Attorney, Agent, or Firm* — Hewlett Packard Enterprise Patent Department

(57) ABSTRACT

Approaches for updating an error policy based on boot-time error information and run-time error information, are described. The error policy maps an error type with a prescribed action. In an example, the error policy is updateable based run-time error information corresponding to a computing device. The updated error policy may then be used for addressing boot-time errors of computing devices.

20 Claims, 6 Drawing Sheets

(56) References Cited

U.S. PATENT DOCUMENTS

| | | | | |
|---|---|---|---|---|
| 2018/0074884 A1* | 3/2018 | Cady | ................... | G06F 11/0787 |
| 2021/0311833 A1* | 10/2021 | Bulusu | ................ | G06F 11/2033 |
| 2022/0318093 A1* | 10/2022 | Bulusu | ................ | G06F 11/1438 |

* cited by examiner

UPDATING ERROR POLICY

BACKGROUND

In distributed computing environment, multiple computing devices may be connected with each other to perform computing tasks in a decentralized manner. Examples of such computing devices include, but are not limited to, file servers, application servers, web servers, database servers, virtual servers, monitoring and management servers, networking servers, and many more. The computing devices when started, may undergo "boot up" process during which firmware of the computing device is executed. During boot up, certain tests or functions may be performed to recognize and address occurrence of error in components of the computing device. In case an error is encountered, the computing device ascertain the type of occurred error and performs a pre-defined hardcoded action to rectify the error. Information pertaining to the errors and the actions undertaken may be recorded in an error log. Once the computing device is fully initialized, the error log may be destroyed.

BRIEF DESCRIPTION OF FIGURES

Systems and/or methods, in accordance with examples of the present subject matter are now described and with reference to the accompanying figures, in which.

DETAILED DESCRIPTION

Figure 1:
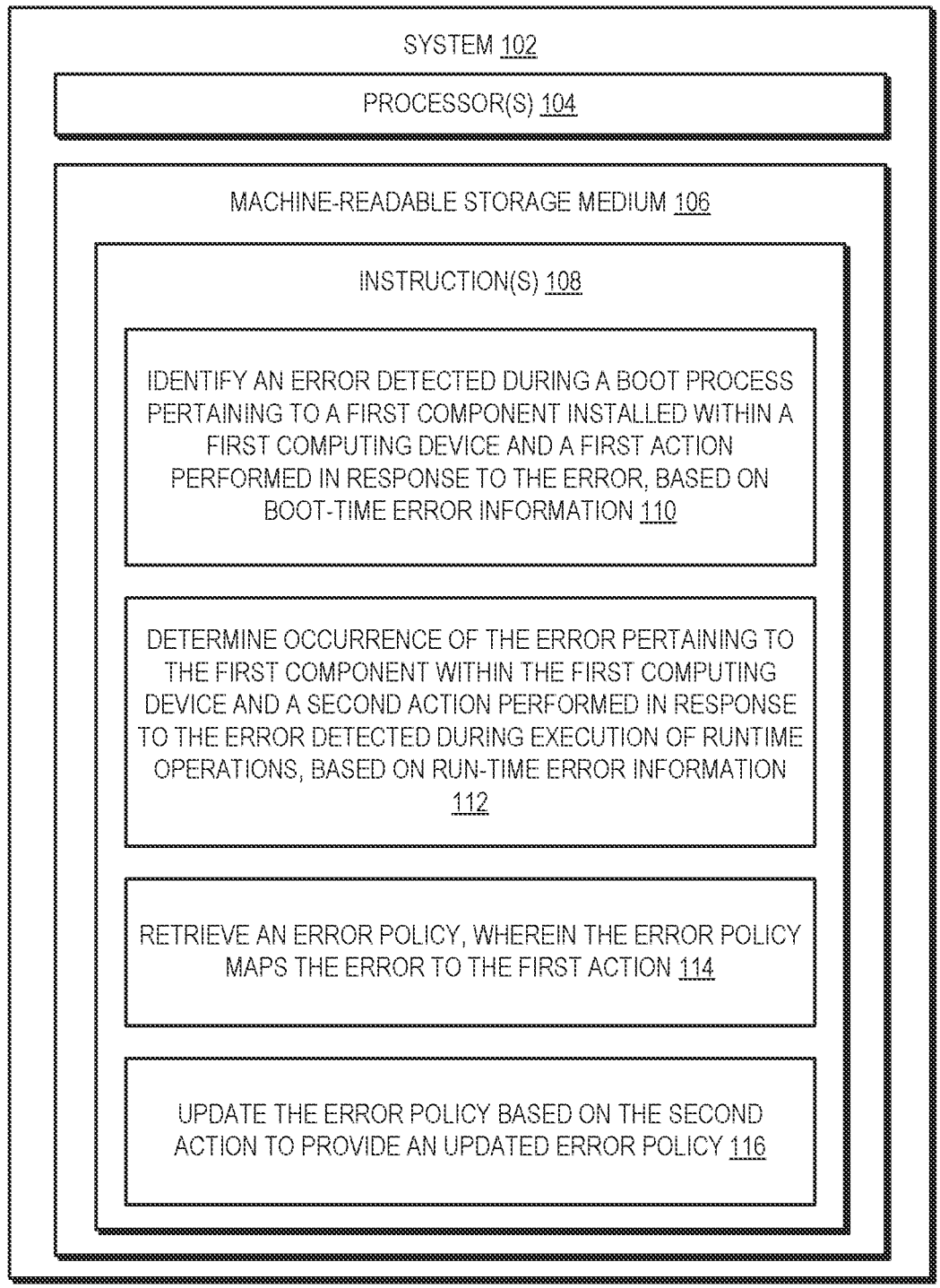
FIG. 1 illustrates a computing system for updating an error policy for a computing device, as per an example.

Distributed computing environment may be understood as a collection of separate and independent computing devices that are networked together, and function in a coordinated manner to perform various computing operations. Examples of computing devices which are present in the distributed computing environment include, but may not be limited to, different types of servers, such as file server, application servers, web servers, database servers, virtual servers, monitoring and management servers, and many more. Such computing devices may further include several hardware or software components, such as memory, communication bus, firmware components, network interface cards, and such. Once initialized, these components perform their respective operations for enabling performant operation of the computing device.

To initialize components, a process called "boot up" is performed on the computing devices. The boot up is initiated once the computing device under consideration is powered on. As used herein, the term "boot process" begins with retrieving and executing a firmware of the computing device and ends when the computing device is turned over to a higher-level operating system (e.g., LINUX, WINDOWS, UNIX, etc.). During boot up, an error recognition test may be executed to assess and test the components of the computing device. Based on such error recognition tests, an operational state of components of the computing device may be assessed. For example, error recognition tests performed for the main memory module of the computing device may be performed to check for certain memory related errors. The main memory module may include a series of random access memory units. A fault in any one or a plurality of units may result in an error which is detected by the error recognition tests. Examples of memory errors include, but may not be limited to, memory mismatch error, memory parity interrupt error, memory address error, memory failure error, memory read error, memory write error, memory verify error and many more. In an example, such memory errors may be generated due to, inappropriate input power surge, mishandling of the device, overheating, development of corrosion between memory module and socket, and many more.

During such error recognition tests, a number of error recognition signals may be transmitted to different components of the computing device and in response, the components provides their response as a response signal. Based on the response signal, a type and severity of the error may be assessed. In an example, the error recognition tests may be implemented by a controller, such as the board management controller of the corresponding computing device. As a result of error recognition test, a boot-time error log is generated which includes data related to the errors encountered in the component during the boot process. Based on the type and severity of the identified error, an action is selected and performed by the computing device to rectify or correct the error in the components. For errors encountered by the main memory, examples of such actions include, but are not be limited to, de-configuring, map-out, or disable (in case individual portions of the main memory are faulty). Examples of results caused by implementing such actions include, but may not be limited to, disabling a portion of the memory, remapping a portion of memory to a spare location, sparing a portion of memory, etc. In current scenarios, the actions performed by the computing device are pre-defined hard coded actions which are present within the firmware and may not be alterable. In such a case, the actions to be performed may be present in the form of an error policy which may persist with the board management controller of the corresponding computing device.

It is possible that the actions undertaken during the boot up may not be appropriate for the error that occurred during the boot up. If the underlying cause of the error is not addressed, the computing device may experience such errors again during run-time. As used herein, the term "run-time" is considered a time after the boot process, where the computing system is turned over to a higher level operating system. Run-time may be considered as a stage in the operation of the computing device where the computing device may have initialized. During such a stage, an operating system of the computing device may be initialized enabling execution of applications on the computing device. If the errors which may have occurred during the boot process were not addressed appropriately during the boot process, it is possible that such errors may occur during run-time. Addressing such errors during run-time (referred to as run-time errors) may impose a strain on computing resources of the computing devices deployed within the distributed computing environment or may cause disruptions. For example, performing corrective actions during run-time may involve utilization of computational resources which may impact the throughput of such computing devices, and delayed correction of these errors may even result in system crash, system failure, or system downtime may increase.

Furthermore, even if actions to correct errors are performed, it is possible that the performed action may not have been suitable for addressing the run-time error. It is possible that the errors that may occur may differ across different distributed computing environments having different configurations, such as number of computing devices, applications installed, and such. Determining appropriate actions for addressing such errors may be accordingly pose challenges considering such differences. Hard-coded predefined actions for prespecified errors may not provide adequate error correction mechanisms in such distributed computing environments.

Approaches for updating an error policy based on boot-time error information and run-time error information, are described. The boot-time error information and run-time error information may be of a first computing device. Once updated, the updated error policy may be utilized for correcting a certain error that may occur during boot process of one of the computing devices deployed within the distributed computing environment. In an example, an error analysis system is deployed such that it is in communication with computing devices within the distributed computing environment. The error analysis system is to analyse and provide an updated error policy based on the boot-time error information and run-time error information of the first computing device. The boot-time error information may include details regarding errors encountered during the boot up and the corresponding actions which may have been performed to correct the error. In one example, the error analysis system identifies an error pertaining to the first component detected during a boot process (referred to as a boot-time error) and a first action performed in response to the error based on the boot-time error information. Examples of boot-time errors included include, but may not be limited to, memory mismatch error, memory parity interrupt error, memory address error, memory failure error, memory read error, memory write error, and memory verify error.

Once identified, an occurrence of the error pertaining to the first component during execution of run-time operation and a second action performed in response to the error, may be determined based on the run-time error information. In an example, the run-time error may be similar to the error encountered during boot process and if not rectified adequately at the time of boot up, may result in an occurrence of such errors again during run-time.

Thereafter, an error policy which maps the boot error to the first action, which performed in response to the occurred error, is retrieved. In an example, the error policy may be retrieved from the memory of the error analysis system or from other computing devices installed within the distributed computing environment. Once retrieved, the error policy is updated based on the second action, to provide an updated error policy. In an example, if the same error which is encountered during boot process has resulted in errors during run-time operations for which a different second action was performed, the error policy is updated to map the second action as the action to be taken if the same error occurs during boot up in the computing devices which are deployed within the distributed computing environment. In another example, the error analysis system may utilize run-time error information of other computing devices obtained from other computing device for updating the error policy based on the error-action relationship mentioned in the run-time error information of other computing devices.

Once updated, the updated error policy may be utilized by any one of the computing devices within the distributed computing environment, during their boot up process. In an example, if a current error is detected during boot up of one of the computing device, the updated error policy which is mapping the current error type with a prescribed action is retrieved. Once retrieved, an action is selected from the updated error policy to address the current error during the boot up of the computing device. Since the updated error policy outlines the actions which have been observed as being effective for addressing the current error for other computing devices, the possibility of addressing the current error for the given computing device is high at the time of boot up itself.

As will be explained further, the present approaches enable updating an error policy based on the actions performed by one or multiple other computing devices in response to the occurrence of similar errors. Since the error policy is updated based on the actions performed by other computing devices for similar errors $2s$ based on the boot-time and run-time error information of other computing devices, an updated action is available for selection, and the selected action is performed by any of the computing devices within the distributed computing environment to correct the occurred error. With the updated error policy generated, appropriate action may be selected and performed by the computing devices. These and other approaches are further explained in conjunction with the accompanying figures.

FIG. 1 illustrates an example system 102 for updating an error policy. The error policy is updated based on boot-time error information and run-time error information corresponding to a first computing device, in accordance with an example. The system 102 includes a processor 104, and a machine-readable storage medium 106 which is coupled to, and accessible by, the processor 104. The system 102 may be implemented in any computing system, such as a server, desktop or a laptop computing device, a distributed computing enabled system, or the like. Although not depicted, the system 102 may include other components, such as interfaces to communicate over the network or with external storage or computing devices, display, input/output interfaces, operating systems, applications, data, and the like, which have not been described for brevity.

The processor 104 may be implemented as a dedicated processor, a shared processor, or a plurality of individual processors, some of which may be shared. The machine-readable storage medium 106 may be communicatively connected to the processor 104. Among other capabilities, the processor 104 may fetch and execute computer-readable instructions, including instructions 108, stored in the machine-readable storage medium 106. The machine-readable storage medium 106 may include non-transitory computer-readable medium including, for example, volatile memory such as RAM (Random Access Memory), or non-volatile memory such as EPROM (Erasable Programmable Read Only Memory), flash memory, and the like. The instructions 108 may be executed to update an error policy of the computing devices.

In an example, the processor 104 may fetch and execute instructions 108. In one example, as a result of the execution of the instruction 110, the system 102 may identify an error that may have been detected during a boot process of a first component. The error (referred to as a boot-time error) may be identified based on boot-time error information. The first component may be installed within the first computing device. In addition to identifying the error, the boot-time error information may be used for identifying a first action performed in response to the detected boot-time error.

Once the boot-time error and corresponding performed first action is identified, the instructions 112 may be executed to determine further errors that may have occurred during run-time, based on run-time error information. In an example, run-time error information may also indicate information pertaining to actions that may have been performed for addressing the occurred errors. The errors occurred during run-time operations in first component of the first computing device may be similar to that of the error encountered during boot up, but the action performed during run-time to rectify the error may be different. In an example, instructions 112 may be executed to detect whether the error which had occurred during booting up of the computing device, has further occurred during run-time. As described previously, run-time may refer to a stage when an operating system and other components of the computing device have been initialized.

Once the errors and corresponding actions performed during boot up and run-time are determined, as a result of the execution of the instructions 114, the system 102 may retrieve an error policy. In an example, the error policy includes a mapping of the boot-time error and corresponding performed first action. In one example, the system 102 may retrieve the error policy directly from a main memory of the first computing device or from its own memory. Once retrieved, the error policy may be updated based on the second action to provide an updated error policy. To this end, the instructions 116 may be executed to update the error policy based on the run-time error information. For example, if the error detected pertaining to the first component during boot process and run-time operation is same, the error policy is updated based on the second action to provide the updated error policy. Once updated, the updated error policy may be shared with any one of the computing devices installed within the distributed computing environment to be used by these devices to select and perform updated action to correct the similar error.

The above functionalities performed as a result of the execution of the instructions 108, may be performed by different programmable entities. Such programmable entities may be implemented through different computing systems, which may be implemented either on a single computing device, or multiple computing devices. As will be explained, various examples of the present subject matter are described in the context of a computing system for updating the error policy based on the boot-time error information and run-time error information, and thereafter, utilizing the updated error policy in computing devices installed within the distributed computing environment to correct the similar errors detected during their boot up. These and other examples are further described with respect to other figures.

Figure 2:
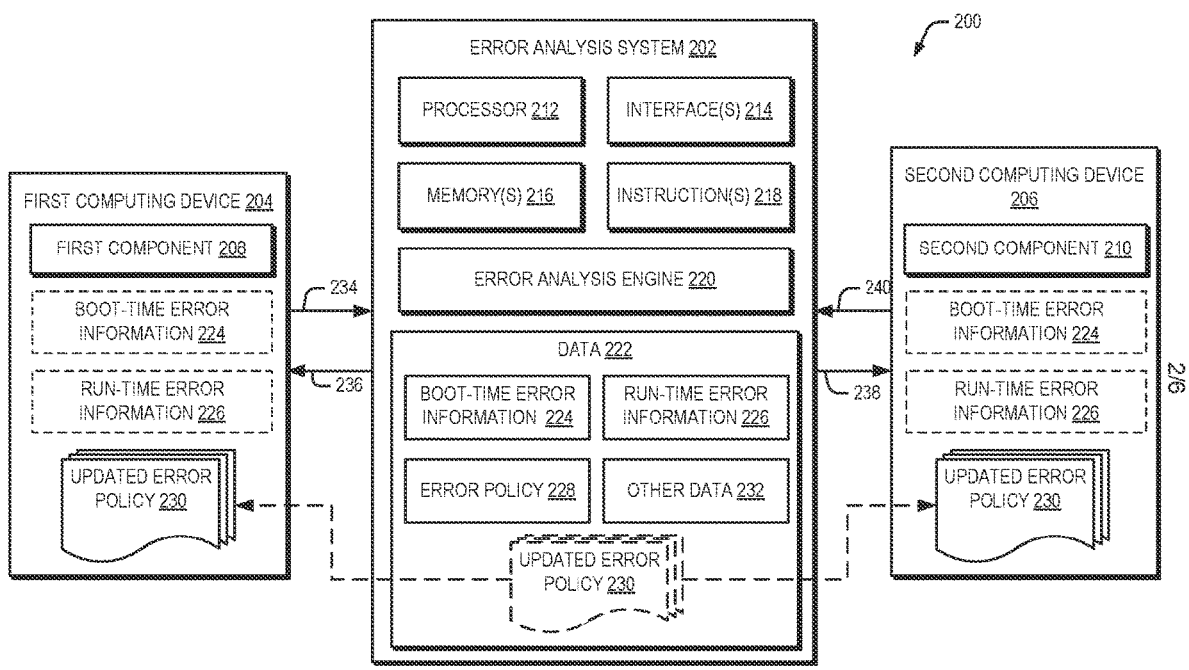
FIG. 2 illustrates an error analysis system for updating an error policy for computing devices, as per another example.

FIG. 2 illustrates a distributed computing environment 200 (referred to as environment 200) comprising an error analysis system 202. The error analysis system 202 (referred to as system 202) is used for updating an error policy based on run-time error information. The run-time error information may be the error information generated at the time of execution of run-time operations in a first computing device 204, and other computing devices (e.g., a second computing device 206) deployed within the environment. In an example, the system 202 may utilize the error information generated at the time of execution of run-time operations in the first computing device 204 to update the error policy and subsequently share the updated error policy with first computing device 204 or other computing devices deployed within the environment 200. In an example, the first computing device 204 may be a computing device in which the process of boot up has completed, and with the first computing device 204 once initialized, initiates run-time operations. Run-time may be considered as a stage in the operation of the computing device where the computing device may have initialized. During such a stage, an operating system of the computing device may be initialized enabling execution of applications on the computing device. Examples of such a computing device include, but are not limited to, file server, application servers, web servers, database servers, virtual servers, monitoring and management servers, and many more.

In an example, the system 202 may be communicatively coupled to the first computing device 204 and a second computing device 206 through a network (not shown in FIG. 2) in the environment 200. The network may be a private network or a public network and may be implemented as a wired network, a wireless network, or a combination of a wired and wireless network. The first computing device 204 and the second computing device 206 may further include a first component 208 and a second component 210, respectively. One of the examples of such components is a main memory component like DIMMs (Dual In-line Memory Module). The first component 208 of the first computing device 204 may be similar to the second component 210 of the second computing device 206.

The system 202 may further include a processor 212, interface(s) 214, and memory 216. The processor 212 may be implemented as microprocessors, microcomputers, microcontrollers, digital signal processors, central processing units, state machines, logic circuitries, and/or other devices that manipulate signals based on operational instructions. Among other capabilities, the processor 212 may be configured to identify or determine an action performed in response to an error occurred during boot up and run-time operations and subsequently utilize this information to update an error policy. The updated error policy with an error-action mapping may be applied for reducing instances of wrong action selection for errors occurred in first computing device 204 and other computing devices. In an example, the updated error policy may be applied in response to detection of the error for the second component 210 installed within the second computing device 206 within the environment 200.

The interface 214 may allow the connection or coupling of the system 202 with one or more computing devices, such as first computing device 204 and second computing device 206 through a wired network, a wireless network, or a combination of a wired and wireless network. The interface 214 may also enable intercommunication between different logical as well as hardware components of the system 202.

The memory 216 may be a computer-readable medium, examples of which include volatile memory (e.g., RAM), and/or non-volatile memory (e.g., Erasable Programmable read-only memory, i.e., EPROM, flash memory, etc.). The memory 216 may be an external memory, or internal memory, such as a flash drive, a compact disk drive, an external hard disk drive, or the like. The memory 216 may further include data which either may be utilized or generated during the operation of the system 202.

Similar to the system 102, the system 202 may further include instructions 218 and an error analysis engine 220. In an example, the instructions 218 are fetched from the memory 216 and executed by the processor 212 included within the system 202. The error analysis engine 220 may be implemented as a combination of hardware and programming, for example, programmable instructions to implement a variety of functionalities. In examples described herein, such combinations of hardware and programming may be implemented in several different ways. For example, the programming for the error analysis engine 220 may be executable instructions, such as instructions 218. Such instructions may be stored on a non-transitory machine-readable storage medium which may be coupled either directly with the system 202 or indirectly (for example, through networked means). In an example, the error analysis engine 220 may include a processing resource, for example, either a single processor or a combination of multiple processors, to execute such instructions. In the present examples, the non-transitory machine-readable storage medium may store instructions, such as instructions 218, that when executed by the processing resource, implement error analysis engine 220. In other examples, the error analysis engine 220 may be implemented as electronic circuitry.

The system 202 may further include data 222. The data 222 may include corresponding data that is utilized or generated by the system 202, while performing a variety of functions. In an example, the data 222 further includes boot-time error information 224, run-time error information 226, an error policy 228, and other data 232. Further, the other data 232, amongst other things, may serve as a repository for storing data that is processed, or received, or generated as a result of the execution of the instructions by the processor 212.

In operation, the error analysis engine 220 of the system 202 may obtain boot-time error information 224 from the first computing device 204 (indicated by arrow 234). The process will be described in the context of boot-time error information 224 and the run-time error information 226 obtained from the first computing device 204, for errors encountered by the first component 208. Such a process may be implemented for the second computing device 206 as well, wherein the system 202 may obtain boot-time error information 224 and the run-time error information 226 from the second computing device 206, for errors encountered by the second component 210.

In an example, the system 202 may obtain the boot-time error information 224 from the first computing device through a communication connection formed using the interface 214 between the system 202 and the first computing device 204. The boot-time error information 224 may include details regarding boot-time errors encountered by the first component 208. For main memory as the first component 208, examples of boot-time errors include, but may not be limited to, memory mismatch error, memory parity interrupt error, memory address error, memory failure error, memory read error, memory write error, memory verify error, etc. In addition, the boot-time error information 224 may also include information pertaining to corresponding actions which may have been performed by the first computing device 204 to correct such encountered errors.

For errors encountered by the main memory, examples of such actions include, but are not be limited to, de-configuring, map-out, or disable (in case individual portions of the main memory are faulty). Examples of results caused by implementing such actions include, but may not be limited to, disabling a portion of the memory, remapping a portion of memory to a spare location, sparing a portion of memory, and many more. In an example, the boot-time error information 224 may be generated by the first computing device 204 upon booting. For example, during boot up, certain error recognition tests may be executed by the first computing device 204 to check operational status of the components of the first computing device 204 which in turn generates boot-time error information 224. During such error recognition tests, a number of error recognition signals may be transmitted to different components of the computing device and in response, the components provides their response as a response signal. Based on the response signal, the memory controller ascertain type and severity of the errors. As a result of error recognition test, the boot-time error information 224 is generated.

Thereafter, the error analysis engine 220 of the system 202 may process the boot-time error information 224 to identify a boot-time error pertaining to the first component 208, and a corresponding first action performed in order to correct the boot-time error. In an example, the boot-time error information 224 is a table including identifier of the components, errors detected in the components, and the corresponding actions performed in response to the detected error during boot up of the first computing device 204. In one example, the actions performed in response to occurrence of errors during boot up may be hard-coded predefined actions. Indicative example of boot-time error information 224 for a plurality of main memory components [0], [1], . . . , [N], of the first computing device 204 is provided below, as per one example, in Table 1. Table 1 depicts types of error encountered by each main memory and corresponding actions performed to rectify the errors detected during boot up. The below table depicts an exemplary boot-time error information 224 and is not to be construed as limiting the scope of the present subject matter.

TABLE 1

| Failed Device | Error Type | Actions |
| --- | --- | --- |
| MAIN MEMORY [0] | Warning type 1 | Ignore/No action |
| MAIN MEMORY [1] | Warning type 2 | sPPR |
| . . . | . . . | . . . |
| MAIN MEMORY [n] | Warning type-N | Rank sparing |

As depicted in Table 1, the boot-time error information 224 is indicated as table in which identifier of each portion of main memory are mapped with corresponding error type experienced during boot up, and corresponding actions performed by the first computing device 204 to correct the error. For example, during boot up of first computing device 204, the main memory [0] experienced a 'Warning type 1' for which no action was undertake. Such an error may be less critical thereby not warranting performing any action during the booting up of the first computing device 204, the main memory [1] detects 'Warning type 2' and corresponding example action performed by the first computing device 204 is soft Post-Package Repair (sPPR), and the main memory [n] detects warning type-N and corresponding, example action performed by the first computing device 204 is rank sparing. In an example, the Post Package Repair (PPR) enables a memory controller to remap a faulty row of the main memory to a functional spare row of the main memory. There are two types of PPR available, i.e., soft PPR (sPPR) and hard PPR. The sPPR temporarily remaps access from the faulty row to the designated spare row and hard PPR may permanently remaps an access from the faulty row to a designated spare row. Further, rank sparing reserves memory capacity for failover in the event of the DIMM failure, and the reserved capacity is subtracted from the total available memory.

Once the boot up of the first computing device 204 is completed and the hardware or software components of the first computing device 204 have been initialized, the first computing device 204 may be ready to execute run-time operations. Execution of run-time operations may be considered as a stage in the operation of the computing device where the computing device may have initialized. At this stage, an operating system of the computing device may be initialized enabling execution of applications on the computing device. During run-time, the first computing device 204 may too experience errors, either similar to the boot-time errors or different errors. On encountering such errors, the first computing device 204 may perform actions to correct the errors.

In an example, the first computing device 204 may include a System Management Mode (SMM) which is a predefined mode during which the execution of the operating system (OS) may be suspended and the processor is placed in a suspended execution space. In the context of SMM, certain functions such as Adaptive Double DRAM Device Correction (ADDDC), Single Device Data Correction (SDDC), and Post-Package Repair (PPR) may be implemented. As a result, the first computing device 204 may perform actions, such as sparing, de-configuring, indictment, and such to correct the errors detected during run-time in the first computing device 204.

Such information pertaining to errors and the actions performed during run-time may be obtained in the form of run-time error information 226 (indicated by arrow 234). The run-time error information 226 may include identifiers of components, types of errors occurred in the components, and actions performed in response to the occurrence of errors during execution of run-time operations. For example, during execution of run-time operations, the first computing device 204 may encounter error in first component 208 and in response, the first computing device 204 may perform a second action to rectify the error. For such events (i.e., encountering of errors and performing actions), the first computing device 204 generates run-time error information 226 to be shared with the system 202.

Based on the run-time error information 226 obtained from the first computing device 204, the error analysis engine 220 may determine the error encountered by the first component 208 during run-time. Examples of run-time errors include, but may not be limited to, memory mismatch error, memory parity interrupt error, memory address error, memory failure error, memory read error, memory write error, memory verify error and many more. In an example, such memory errors may be generated due to, inappropriate input power surge, mishandling of the device, overheating, development of corrosion between memory module and socket, and many more.

The error analysis engine 220 may also determine based on the run-time error information 226, a second action performed in response to the error detected during run-time. Examples of second actions include, but are not be limited to, de-configuring, map-out, or disable (in case individual portions of the main memory are faulty). In an example, the type of error occurred at the time of boot-time and run-time may be similar, but the actions performed in response to errors may be different as the severity of errors may have been increased from boot-time to runtime. For example, for an error occurred during boot up, first action is performed. However, the same error may also occur during run-time as well, and this time device performs second action which is different from the action performed at the time of boot up. Therefore, it may be advantageous to perform second action at the time of boot up itself to prevent occurrence of error during runtime which may reduce load on computational resources of the computing device. In one example, the run-time error information 226 may be represented in the form of a table which includes an identifier of the components (such as the first component 208) in first column, errors detected in the components in second column, and the corresponding actions performed in response to the detected error during execution of run-time operations in third column.

Indicative example of the run-time error information 226 for the first component 208 is listed below, as per an example, in Table 2. Table 2 depicts types of error encountered by the first component 208 being a main memory of the first computing device 204. The below table depicts an exemplary run-time error information 226 and is not to be construed as limiting the scope of the present subject matter. Run-time error information 226 for other components may also be obtained and analyzed without deviating from the scope of the present subject matter.

TABLE 2

| Failed Device | Error Type | Actions |
|---|---|---|
| Main Memory [0] | Warning type 1 | sPPR |
| Main Memory [1] | Warning type 2 | Rank Sparing |
| . . . | . . . | . . . |
| Main Memory [n] | Warning type-N | De-configure DIMM |

As depicted in Table 2, the run-time error information 226 is indicated as table in which identifier of each portion of main memory are mapped with corresponding error type detected during run-time, and corresponding actions performed by the first computing device 204 to correct the error. For example, during execution of run-time operations in first computing device 204, the main memory [0] experienced a 'warning type 1' for which 'sPPR' action was undertaken. Such an error may be temporary which may be corrected by performing sPPR, the main memory [1] detects 'warning type 2' and corresponding example action performed by the first computing device 204 is 'Rank sparing', and the main memory [n] detects 'warning type-N' and corresponding, example action performed by the first computing device 204 is 'De-configure DIMM'. It may be noted that the run-time error information 226 as depicted above is only indicative and is not to be construed as a limitation.

Once the boot-time error information 224 and the run-time error information 226 are analyzed, the error analysis engine 220 of the system 202 may retrieves the error policy 228. The error policy 228 may be obtained from memory 216 or from main memory of other computing devices within the environment 200 representing a table indicating mapping of boot-time error with corresponding first action which needs to be performed to rectify the error. In an example, initially, the error policy 228 is a mapping of errors and corresponding hard-coded pre-defined actions which are either specified by component proprietor or firmware proprietor. In an example, the error-action mapping provided in the boot-time error information 224 is similar to that of the mapping described in error policy. It may be noted that, such hard-coded pre-defined actions may not be appropriate to correct the error detected during boot up. However, if same actions have been performed and does not able to rectify the error appropriately, the same error may again appear at the time of run-time operations and may impose unprecedented strain on computing resources of the first computing device 204. For example, performing corrective actions during run-time may involve utilization of computational resources which may impact the throughput of such computing devices and delayed correction of these errors may even result in system crash, system failure, or system downtime may increase.

Continuing with the present example, once the error policy 228 is retrieved, the error analysis engine 220 may update the error policy based on the run-time error information 226. The run-time error information 226 may be obtained from any one or more of the computing devices (e.g., the computing devices 204, 206) within the environment 200. While updating, the error analysis engine 220 may ascertain whether the first component 208 (e.g., the main memory portion) which is indicated in the boot-time error information 224, has experienced a similar error during run-time as well. If the first action performed to address the boot-time error is different from the second action performed to address the run-time error, the error analysis engine 220 may generate a new mapping, in which the said error is additionally mapped with the second action to update the error policy 228, to provide an updated error policy 230. In an example, the error analysis engine 220 may compare the first action indicated in boot-time error information 224 with second action indicated in run-time error information 226. On determining that the first action and the second action were different, the error analysis engine 220 may generate a new mapping for the error with the second action to update the error policy 228. The updated error policy 230 thus obtained may then be used during the boot process of other computing devices (e.g., the second computing device 206). In an example, the updated error policy 230 may be processed by a board management controller (not shown in FIG. 2) of the second computing device 206 to monitor and address errors based on the updated error policy 230. The controller during boot up may retrieve the updated error policy 230 to perform tests based on which one or a plurality of errors may be detected and addressed. In an example, the error policy 228 and the updated error policy 230 may be generated based on a bipartite graph and to update the error policy 228, the error analysis engine may update the mapping of errors with corresponding actions in the bipartite graph. The process of updating the bipartite graph will be explained in conjunction with FIG. 3.

Continuing with the present example, the error analysis engine 220 may also obtain run-time error information, similar to the run-time error information 226, from other computing devices (such as the second computing device 206). In an example, the error analysis engine 220 may receive run-time error information 226 pertaining to an error encountered in a valid component within in a reference computing device. The reference computing device may be one of the other computing devices present within the environment 200 except first computing device 204. Similar to the run-time error information 226 received from the first computing device 204, the run-time error information received from the reference computing device may also include information pertaining to a run-time action performed in response to the encountered error during run-time.

In another example, the run-time action included in the run-time error information 226 received from the reference computing device may be similar to that the second action included in the run-time error information 226 obtained from the first computing device 204. Thereafter, the error analysis engine 220 determines similarity between the encountered error and the error detected pertaining to the first component 208 of the first computing device 204. If encountered error is similar to that of the error detected in first computing device 204, the error analysis engine 220 may update the mapping of the error based on the second action to update the error policy 228 and generates the updated error policy 230. The updated error policy 230, thus generated, may include a mapping of the error to two or more actions that may have been performed for addressing the given error in other computing devices during run-time.

In an example, a weightage factor may be associated for mapping between an error and the action performed for addressing the error. In case a certain type of action is determined to have been performed for addressing a given error in a number of instances in computing devices in the environment 200, the weightage factor for the certain type of action may be increased. A higher weightage factor may thus indicate that the certain action has been performed more for addressing the given error and thus may be likely to address the error as opposed to other actions that may be associated with the given error. Depending on how frequently an action is performed within the environment 200, its corresponding weightage factor may be accordingly increased. This process may be performed for other types of errors mapped to different actions each with their corresponding weightage factors to provide the updated error policy 230. When utilized for addressing such errors as included in the updated error policy 230 during booting up of any computing device, the action with the highest weightage factor may be determined and accordingly performed for addressing the error.

Once the updated error policy 230 is generated, the error analysis engine 220 may transmit the updated error policy 230 to other computing devices deployed within the environment 200. For example, the error analysis engine 220 may provide the updated error policy 230 to the first computing device 204 (as indicated by arrow 236) and to the second computing device 206 (as indicated by arrow 238). On receiving, the first computing device 204 and the second computing device 206 stores the updated error policy 230 in their respective memory or firmware to be used during further boot up. In an example, the updated error policy 230 may be stored within the main memory of the first computing device 204 (or any other computing device within the environment 200).

In the event that any computing device within the environment 200 is to be restarted pursuant to a shut down, say for maintenance, or repairs, the updated error policy 230 may be utilized for addressing any errors that may be encountered during the boot up of the computing device. For example, the updated error policy 230 may be utilized by the first computing device 204 to correct the error occurring during boot up of the first computing device 204 which encounters an error in relation to one of its components, such as the first component 208. In an example, the first computing device 204 may be started up or powered on which in turn initiates the boot process. During boot up, an occurrence of a current error in the first component 208 may be detected by the first computing device 204. In response to current error occurred during boot up, the first computing device 204 may retrieve the updated error policy 230 stored in its main memory. Based on the current error, an error within the updated error policy 230 may be determined. For the determined error, the action with the maximum weightage factor may be subsequently identified. Thereafter, the identified action may be performed for addressing the current error.

The error policy 228 and the updated error policy 230 may be implemented in a number of ways. In an example, the error policy 228 and the updated error policy 230 may be implemented in the form of a bipartite graph. A bipartite graph is a structure of objects having vertices or points which are divided into two independent and disjoint sets. The bipartite graph may further include edges which connect a point in one set to at least one other point in the other set.

Figure 3:
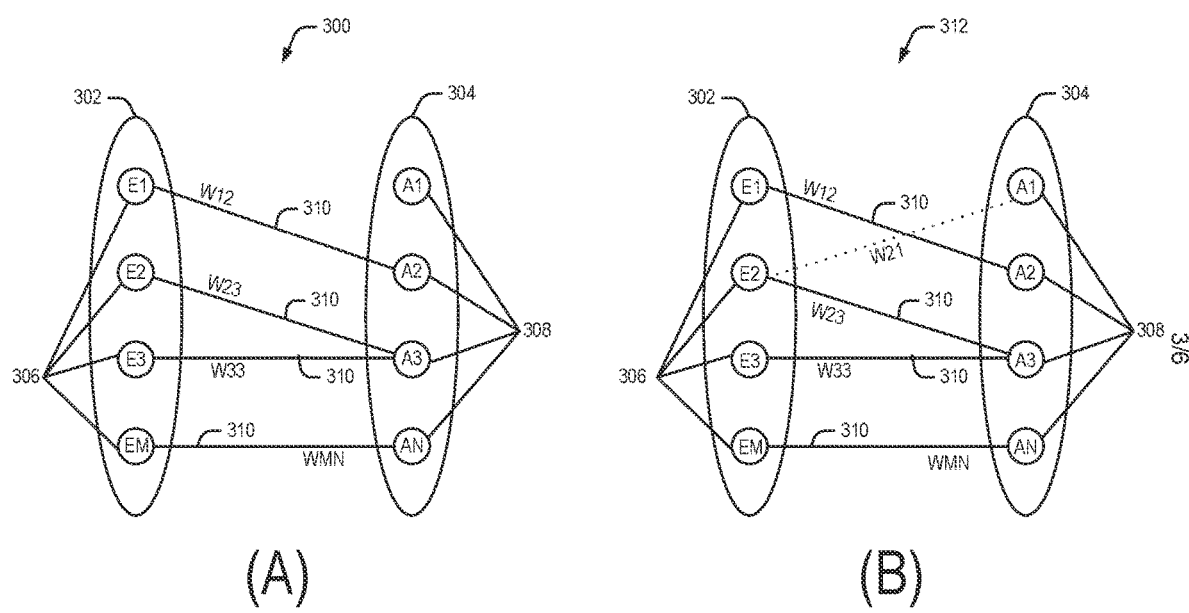
FIG. 3 illustrates a bipartite graph of an error analysis engine, as per an example.

FIG. 3, part A illustrates an example bipartite graph 300 (referred to as graph 300) processed by the error analysis engine 220. In an example, the graph 300 includes two separate sets of nodes, i.e., a first set 302 and a second set 304. The first set 302 includes a plurality of nodes, E1, E2, E3, . . . , EM (collectively referred to as error nodes 306) with each node representing a different type of error or warning for a component of a computing device, which may arise during boot up or run-time. The second set 304 also include a plurality of nodes A1, A2, A3, . . . , AN (collectively referred to as action nodes 308) with each node representing a different action which may have been performed by the computing devices in response to the occurrence of errors to rectify the error.

The error nodes 306 of first set 302 and the action nodes 308 of second set 304 are connected via connecting edges 310 which map the errors with the corresponding actions. In an example, the connecting edges 310 may be associated with weightage factor to form an error-action pair. Therefore, in event of occurrence of error during boot up, the corresponding action node 308 which is mapped to the occurred error node 306 is selected and the action associated with that node may be performed. In an example, each error nodes 306 of first set 302 may be mapped or connected to at least one action nodes 308 of second set 304 and vice-versa. Therefore, in case, error nodes 306 having mapping with more than one action nodes 308 occurred during boot up of the computing device, the action node 308 corresponding to the mapping having higher weightage factor is selected for execution. As will be discussed, the error policy 228 may be updated by the error 2s analysis engine 220 to provide the updated error policy 230 which in turn is represented by graph 312.

As may be understood, FIG. 3A illustrates the graph 300 with each error nodes 306 connected to only one action node 308. For example, error node E1 is connected to action node A2 with the connecting edge 310 having weightage factor W12 (W12 represents weightage factor of the mapping between the error node E1 and action node A2), error node E2 is connected to action node A3 with the connecting edge 310 having weightage factor W23 (W23 represents weightage factor of the mapping between the error node E2 and action node A3), error node E3 is connected to action node A3 with the connecting edge 310 having weightage factor W33 (W33 represents weightage factor of the mapping between the error node E3 and action node A3), and so on.

During run-time, the first component 208 of the first computing device 204 may encounter errors for which certain actions may be performed. Information pertaining to such errors and the corresponding actions may be captured in the run-time error information 226 and is obtained by the error analysis engine 220. For example, the run-time error information 226 may indicate that an error E2 had occurred which was addressed by performing action A1. The error analysis engine 220 may then update the graph 300 indicated in FIG. A to the graph 312 indicated in FIG. 3B by making a new mapping of error node E2 to the action node A1 using connecting edge 310 with weightage factor W21 (W21 represents weightage factor of the mapping between the error node E2 and action node A1). After updating, the error node E2 is now connected to two actions nodes, i.e., A1 and A3. In case error associated with error node 306 having more than one mapping encounters during boot up of any computing device within the environment, the correct action node is selected to be included in the updated error policy 230 by comparing the weightage factor of individual mapping. For example, in case error associated with error node E2 may be encountered during booting of first computing device 204, the weightage factor W23 may be compared with weightage factor W21 and the error-action pair having higher weightage factor is selected as to be included in the updated error policy 230. The same procedure is executed for subsequent event of occurrence of error mentioned in the run-time error information.

In another example, if a node corresponding to an action indicated in the run-time error information 226 is not present in the second set 304, then a new node may be created in the set to indicate the action. The same is implemented in case of error, if a new type of error is mentioned in the run-time error information 226, then a new node is created in the first set 302 to indicate that particular error.

If a certain type of action is determined to have been performed for addressing an occurred error in a number of instances in computing devices present within the environment 200, the weightage factor for the certain type of action may be increased. For example, the run-time error information 226 obtained from any one of the computing devices (such as reference computing device) present within the environment 200 may indicate that an error E2 had occurred which was addressed by performing action A1. The error analysis engine 220 may then update the graph 312 indicated in FIG. 3, part B by updating the existing mapping of error node E2 to the action node A1 using connecting edge 310 having weightage factor W21. The updating of existing mapping is performed by increasing the value of weightage factor W21. If weightage factor of one mapping (e.g., E2 with A1) is higher than the other mapping (e.g., E2 with A3) then it may be concluded that the action A1 has been performed more for addressing the error E2 and thus may be more likely to address the error as opposed to action A3 and may be included in the updated error policy 230. This process may be performed for other types of errors mapped to different actions each with their corresponding weightage factors to provide the updated error policy 230.

Figure 4:
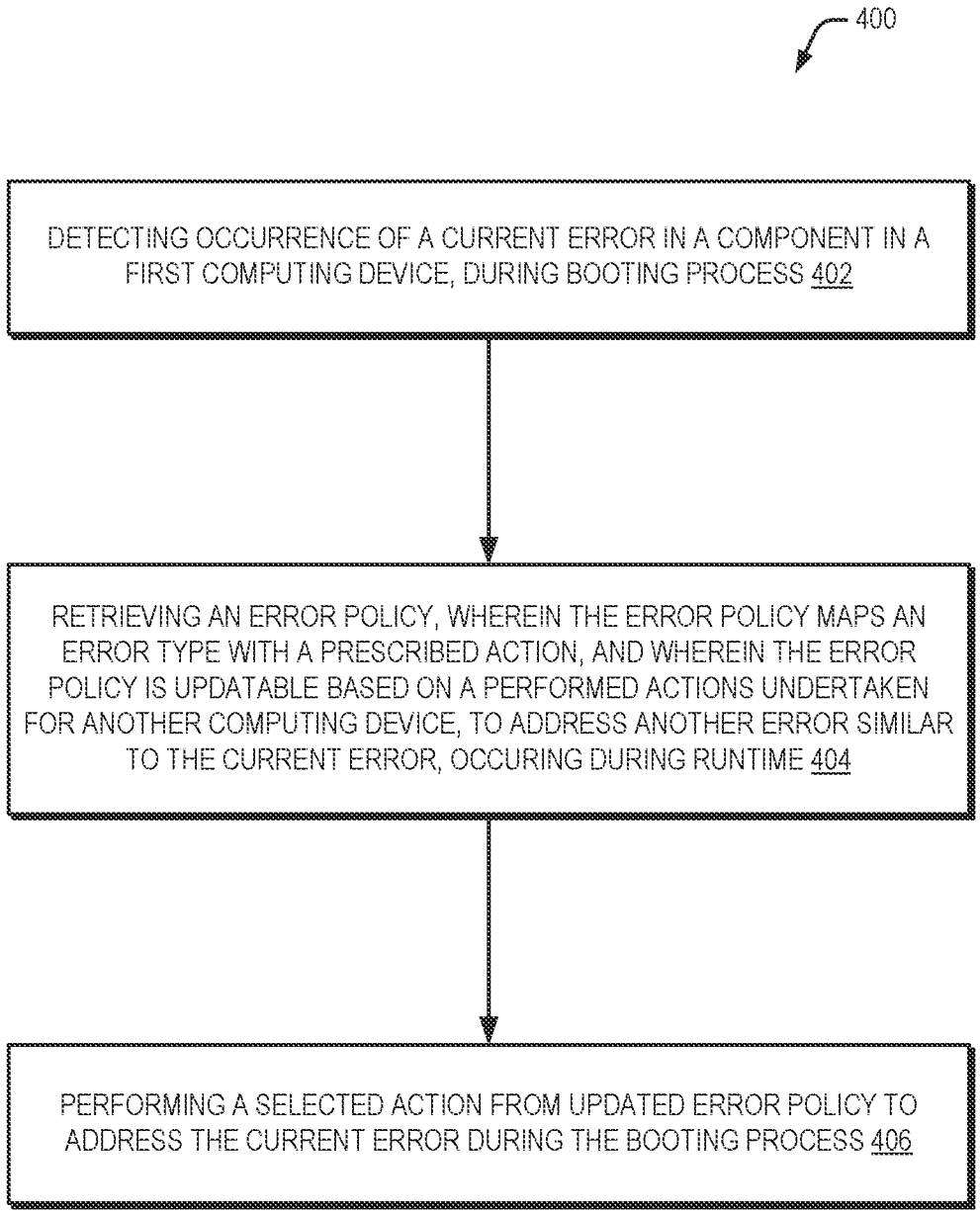
FIG. 4 illustrates a method for retrieving an updated error policy for performing an action in response to a current error, as per an example.

FIG. 4 illustrates an example method 400 for retrieving an updated error policy for performing an action in response to a current error, in accordance with examples of the present subject matter. The order in which the above-mentioned methods are described is not intended to be construed as a limitation, and some of the described method blocks may be combined in a different order to implement the methods, or alternative methods.

Furthermore, the above-mentioned methods may be implemented in a suitable hardware, computer-readable instructions, or combination thereof. The steps of such methods may be performed by either a system under the instruction of machine executable instructions stored on a non-transitory computer readable medium or by dedicated hardware circuits, microcontrollers, or logic circuits. For example, the methods may be performed by a computing device, such as first computing device 204. Herein, some examples are also intended to cover non-transitory computer readable medium, for example, digital data storage media, which are computer readable and encode computer-executable instructions, where said instructions perform some or all the steps of the above-mentioned methods.

In an example, the method 400 may be implemented by the first computing device 204 (or any other computing device present within the environment 200) for retrieving an updated error policy and performing a selected action from the updated error policy. At block 402, an occurrence of a current error in a component of a first computing device may be detected during the boot up. For example, during the boot up, the first computing device 204 may encounter a current error in the first component 208 during boot up. The error may be detected as a result of an error recognition test which may have been performed as part of the boot up.

At block 404, an error policy is retrieved by the first computing device. For example, the first computing device 204 retrieves the error policy or the updated error policy 230 represented as a table mapping errors with corresponding prescribed actions which needs to be performed by the first computing device 204 to rectify the error on the first component 208. The updated error policy 230 is updateable based on an action which is performed for other computing devices to address other errors similar to the current error. Such other errors may be such which may have occurred during run-time of such other computing devices (e.g., the second computing device 206). In an example, the updated error policy 230 is either stored in the main memory of the first computing device 204 or is stored in the system 202 which is in communication with first computing device 204 in environment 200. In case it is retrieved from the main memory of first computing device 204, the updated error policy 230 may have been previously received from the system 202.

At block 406, an action is selected from the retrieved updated error policy 1s to address the current error during the boot up. For example, the first computing device 204 selects an action from the updated error policy 230 based on the current error and subsequently perform the selected action on the first component 208 to rectify the error occurred during the boot up.

Figure 5:
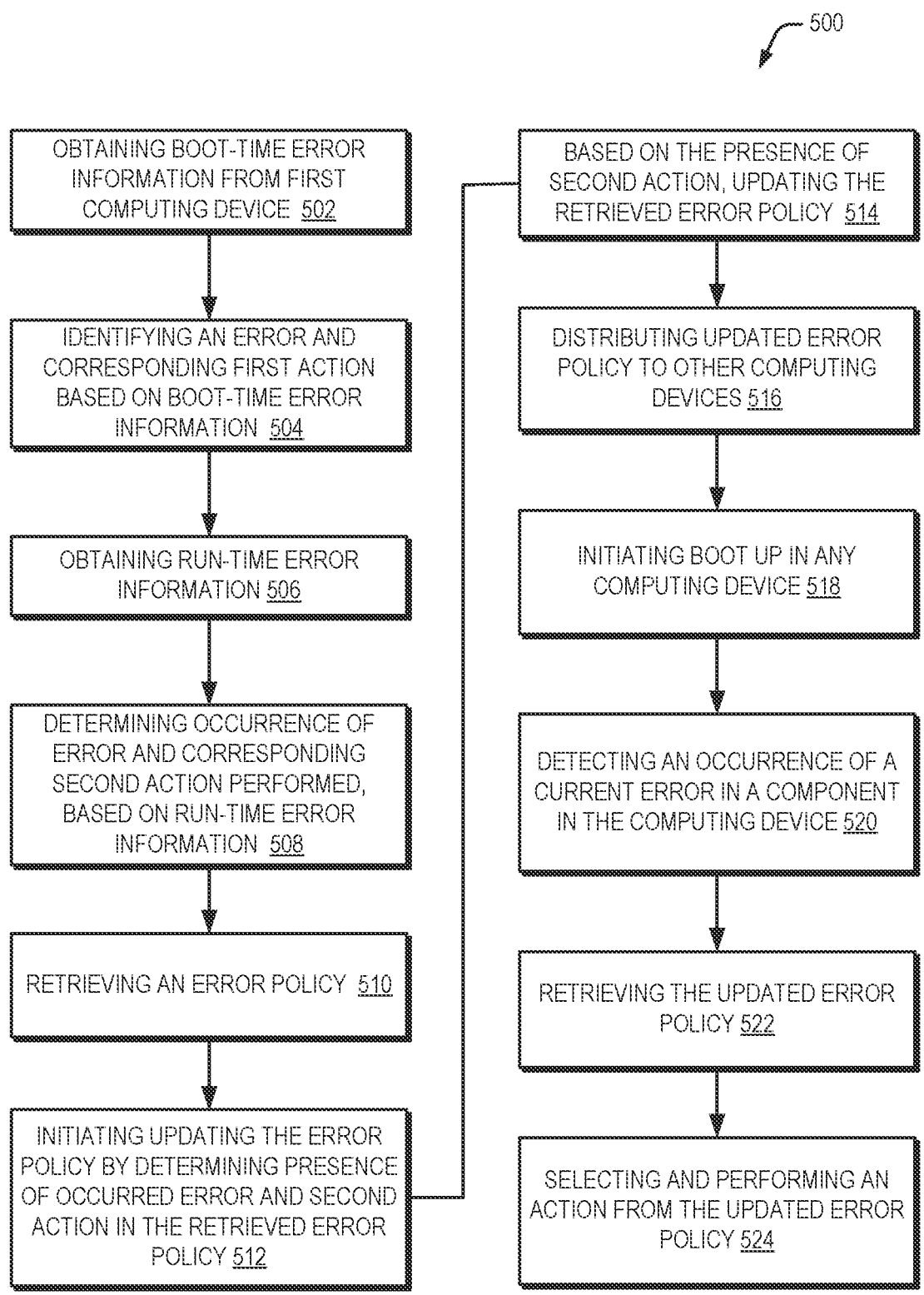
FIG. 5 illustrates a method for updating an error policy and applying the updated error policy to perform an action in response to a current error, as per an example.

FIG. 5 illustrates a method 500 for updating an error policy and utilizing the updated error policy to perform an action in response to a current error, in accordance with examples of the present subject matter. The order in which the above-mentioned methods are described is not intended to be construed as a limitation, and some of the described method blocks may be combined in a different order to implement the methods, or alternative methods.

Furthermore, the above-mentioned methods may be implemented in a suitable hardware, computer-readable instructions, or combination thereof. The steps of such methods may be performed by either a system under the instruction of machine executable instructions stored on a non-transitory computer readable medium or by dedicated hardware circuits, microcontrollers, or logic circuits. For example, the methods may be performed by an error analysis system, such as system 202 and a computing device, such as first computing device 204 or second computing device 206. Herein, some examples are also intended to cover non-transitory computer readable medium, for example, digital data storage media, which are computer readable and encode computer-executable instructions, where said instructions perform some or all the steps of the above-mentioned methods. In the beginning, the method 500 may be implemented by the system 202 for updating the error policy 228 to obtain the updated error policy 230 based on boot-time error information 224 and run-time error information 226 of the first computing device 204 (or of any other computing device present within the environment 200).

At block 502, boot-time error information is obtained from a first computing device. For example, the error analysis engine 220 may obtain the boot-time error information 224 from the first computing device 204 (indicated by arrow 234 in FIG. 2). The boot-time error information 224 may include details regarding boot-time errors encountered by the first component 208. In addition, the boot-time error information 224 may also include information pertaining to corresponding actions which may have been performed by the first computing device 204 to correct such encountered errors. In an example, the boot-time error information 224 may be generated by the first computing device 204 upon booting. For example, during boot up, certain error recognition tests may be executed for the components of the first computing device 204 to check their operational status which in turn generates boot-time error information 224. In another example, the boot-time error information 224 may also be obtained from the second computing device 206 or other computing devices present within the environment 200.

At block 504, an error pertaining to the first component installed within the first computing device and a first action performed during the boot up in response to the error, is identified based on obtained boot-time error information. For example, the error analysis engine 220 may process the boot-time error information 224. Based on processing the boot-time error information 224, the error analysis engine 220 may identify a boot-time error experienced by the first component 208 and corresponding first action performed in order to correct the boot-time error.

At block 506, run-time error information is obtained. For example, the error analysis engine 220 may obtain information pertaining to errors and the actions performed during run-time in the form of run-time error information 226 from the first computing device 204 (indicated by arrow 234 in FIG. 2). The run-time error information 226 may include identifiers of components, types of errors occurred in the components, and actions performed in response to the occurrence of errors during execution of run-time operations. For example, during execution of run-time operations, the first computing device 204 may encounter error in first component 208 and in response, the first computing device 204 may perform a second action to rectify the error. For such events (i.e., encountering of errors and performing actions), the first computing device 204 generates run-time error information 226 to be shared with the system 202. In another example, the boot-time error information 224 may also be obtained from the second computing device 206.

In a further example, the error analysis engine 220 may also obtain run-time error information, similar to the run-time error information 226, from other computing devices (not shown in FIG. 2) present within the environment 200. In an example, the error analysis engine 220 may receive run-time error information 226 pertaining to an error encountered in a valid component within in a reference computing device. The reference computing device may be one of the other computing devices present within the environment 200 except first computing device 204. Similar to the run-time error information 226 received from the first computing device 204, the run-time error information received from the reference computing device may also include information pertaining to a run-time action performed in response to the encountered error.

At block 508, an occurrence of error pertaining to the first component and a second action performed in response to the error occurred during the execution of run-time operations is determined based on the run-time error information. For example, based on the run-time error information 226 obtained from the first computing device 204, the error analysis engine 220, may determine the error encountered by the first component 208 during run-time. The error analysis engine 220 may also determine, based on the run-time error information 226, a second action performed in response to the error detected during run-time. In one example, the run-time error information 226 may be represented in the form of a table (as illustrated in Table 2 above) including an identifier of the components in first column, errors detected in the components in second column, and the corresponding actions performed in response to the detected error during execution of run-time operations in third column.

At block 510, an error policy is retrieved. For example, the error analysis engine 220 may retrieves the error policy 228. In an example, the error policy 228 may be stored in the memory 216 of the system 202 or retrieved from the main memory of the first computing device 204. The error policy 228 may be a table indicating mapping of boot-time error with corresponding first action which needs to be performed to rectify errors. In an example, the error policy 228 in its initial form is a mapping of errors and corresponding hard-coded pre-defined actions which are either specified by component proprietor or firmware proprietor. In an example, the error-action mapping provided in the boot-time error information 224 is similar to that of the mapping described in error policy. It may be noted that, such hard-coded pre-defined actions may not be appropriate to correct the error detected during boot up. However, if same actions have been performed and are not able to rectify the error appropriately, the same error may again appear at the time of run-time operations and may impose unprecedented strain on computing resources of the first computing device 204.

At block 512, the process of updating retrieved error policy is initiated by determining presence of occurred error and second action in the retrieved error policy. For example, the error analysis engine 220 of the system 202 may update the error policy 228 based on the run-time error information 226 (either received from the first computing device 204 or from other computing devices present within the environment 200) to provide the updated error policy 230. While updating, the error analysis engine 220 ascertain whether the same first component 208 (e.g., the main memory portion) which is indicated in the boot-time error information 224 has experienced similar error during run-time as well. If the first action performed to address the boot-time error is different from the second action performed to address the run-time error, the error analysis engine 220 may generate a new mapping, in which the said error is additionally mapped with the second action to update, to provide the updated error policy 230. In an example, the error policy 228 and the updated error policy 230 may be in the form of a bipartite graph. Examples of such graphs include, but are not limited to, graph 300 and graph 312 (as illustrated in FIG. 3). In such a case, while updating graph 300, firstly, the error analysis engine 220 may ascertain the presence of error and second action indicated in the run-time error information 226 in the graph 300. If a node corresponding to the error or second action is not present in the first set 302 or second set 304, respectively, then a new node may be created in the corresponding set to indicate the error or second action.

In another example, the error analysis engine 220 may ascertain that if the second action indicated in the run-time error information 226 is determined to have been performed for addressing occurred error or current error in a number of instances in computing devices present within the environment 200 and nodes for such second action is already present in the graph 300, the weightage factor of connecting edge mapping occurred error with the second action may be increased.

At block 514, the retrieved error policy is updated based on the second action. For example, once the presence of occurred error and second action in the error policy 228 is ascertained, the error analysis engine 220 may update the error policy 228 to obtain the updated error policy 230. For example, if a node corresponding to the error or second action is not present in the first set 302 or second set 304 of graph 300, respectively, then a new node may be created in the corresponding set to indicate the error or second action.

In another example, if the second action indicated in the run-time error information 226 is determined to have been performed for addressing occurred error or current error in a number of instances in computing devices present within the environment 200, the error analysis engine 220 may increase the value of weightage factor of connecting edge mapping occurred error with the second action.

At block 516, updated error policy is distributed to the other computing devices deployed within the distributed computing environment for enabling the other computing devices to perform the updated actions in response to the errors occurred during the boot up. For example, once error policy 228 is updated to obtain the updated error policy 230, it may be distributed to other computing devices to perform the updated actions in response to the errors occurred during the boot up and the updated error policy 230 is stored by the other computing devices in their main memory for subsequent boot up.

At block 518, a boot up is initiated in any of the computing devices present within the distributed computing environment. For example, by pressing the power button for routine power on or powering on the device after resetting, the computing device initiates the boot up and execute an error recognition test on the hardware components of the computing device to check their operational status.

At block 520, an occurrence of a current error in a component of a computing device is detected during the boot up. For example, the first computing device 204 or any other computing device in environment 200 may be started up or powered on which in turn initiates the boot process. During boot up, an occurrence of a current error in a component, such as the first component 208, may be detected by the computing device, such as first computing device 204.

At block 522, an updated error policy is retrieved by the computing device. For example, the first computing device 204 or any other computing device in environment 200 may retrieve the updated error policy 230. The updated error policy 230 may then be used by the computing device, such as first computing device 204 to rectify the error that may occur during boot up of the computing devices (such as the devices 204, 206).

At block 524, an action is selected from the retrieved updated error policy for performing to address the current error occurred during the boot up. For example, based on the current error occurred during boot up, the first computing device 204 may use the updated error policy 230 to search for the error and determine the corresponding action with the maximum weightage factor for addressing the current error which has occurred. Thereafter, the identified action may be performed for addressing the current error.

Figure 6:
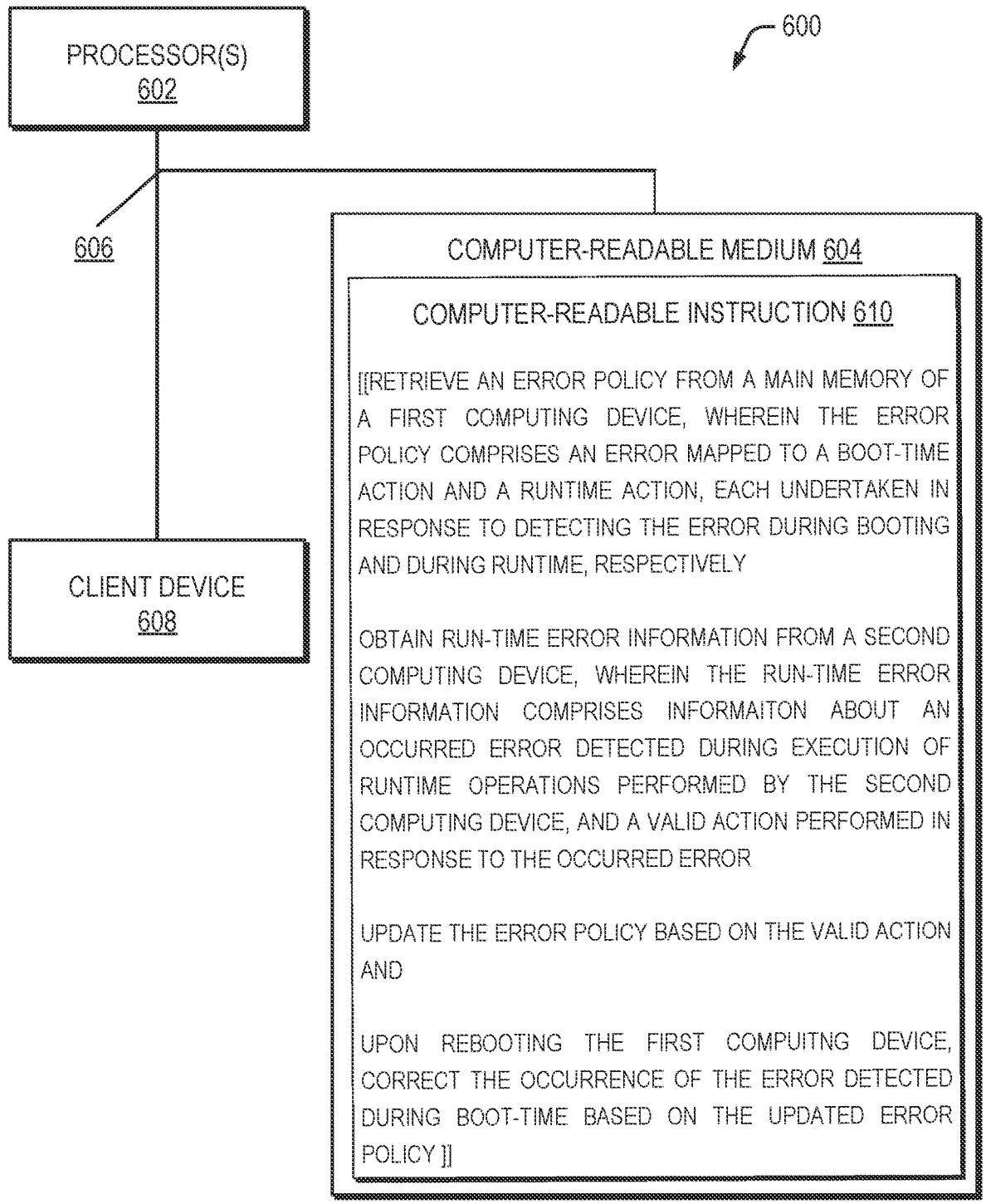
FIG. 6 illustrates a system environment implementing a non-transitory computer readable medium for performing a correct action in response to an error occurred in a computing device, based on an updated error policy, as per an example.

FIG. 6 illustrates a computing environment 600 implementing a non-transitory computer readable medium for updating an error policy retrieved from a first computing device based on run-time error information of a second computing device. Once updated, the updated error policy may be utilized for correcting a certain error that may occurred during boot up of the first computing device. In an example, the computing environment 600 includes processor(s) 602 communicatively coupled to a non-transitory computer readable medium 604 through a communication link 606. In an example implementation, the computing environment 600 may be for example, the system 102 or 202. In an example, the processor(s) 602 may have one or more processing resources for fetching and executing computer-readable instructions from the non-transitory computer readable medium 604. The processor(s) 602 and the non-transitory computer readable medium 604 may be implemented, for example, in system 102 or 202 (as has been described in conjunction with the preceding figures).

The non-transitory computer readable medium 604 may be, for example, an internal memory device or an external memory device. In an example implementation, the communication link 606 may be a network communication link. The processor(s) 602 and the non-transitory computer readable medium 604 may also be communicatively coupled to a computing device 608 over the network.

In an example implementation, the non-transitory computer readable medium 604 includes a set of computer readable instructions 610 (referred to as instructions 610) which may be accessed by the processor(s) 602 through the communication link 606. Referring to FIG. 6, in an example, the non-transitory computer readable medium 604 includes instructions 610 that cause the processor(s) 602 to retrieve an error policy, such as error policy 228 from a main memory of a computing device, such as first computing device 204. The retrieved error policy 228 includes an error mapped to a boot-time action and a run-time action. In one example, the boot-time action and the run-time action are performed in response to detecting the error during boot up and during run-time, respectively.

Thereafter, the instructions 610 may cause the processor(s) 602 to obtain the run-time error information 226 from a second computing device, such as second computing device 206. In an example, the run-time error information 226 includes information about an error occurred or detected during execution of run-time operations in the second computing device 206. The run-time error information 226 further includes a valid action which is performed by the second computing device 206 in response to the error occurred during execution run-time operations. In an example, the run-time error information 226 has a similar structure as illustrated in Table 2. In one example, the error occurred during execution of run-time operations may be similar to that of the error specified in the error policy 228.

Once the run-time error information 226 is obtained, the instructions 610 may be further executed to cause the processor(s) 602 to update the error policy 228 to obtain an updated error policy, such as updated error policy 230 based on the valid action included in the run-time error information 226 of the second computing device 206. In an example, the operation of updating error policy 228 is performed by updating the graph 300 (as described in conjunction with FIG. 3). In an example, if the valid action is not present in the second set 304 of graph 300, then a new node for the valid action is generated and the error specified in the error policy or run-time error information is mapped or connected with the valid action. On the other hand, on determining that the valid action specified in the run-time error information is present in the graph 300 and is similar to run-time action indicated in the error policy, the weightage factor associated with the valid action in the graph is increased. Once the graph 300 is updated, the error policy 228 is updated based on the updated graph 300. Thereafter, the updated error policy 230 is shared with the first computing device 204 to be used by the first computing device 204 during subsequent boot up.

Upon rebooting, the first computing device 204 utilizes the updated error policy 230 to correct the occurrence of error detected during the boot-time. In an example, the updated error policy 230 may also be used by other computing device, such as second computing device 206, to correct the error detected during boot up.

Although examples for the present disclosure have been described in language specific to structural features and/or methods, it is to be understood that the appended claims are not necessarily limited to the specific features or methods described. Rather, the specific features and methods are disclosed and explained as examples of the present disclosure.

I claim:

1. A system comprising:
a processor; and
a machine-readable storage medium comprising instructions executable by the processor to:
identify based on boot-time error information, for a first component installed within a first computing device:
an error pertaining to the first component detected during a boot up, and
a first action performed in response to the error;
determine, based on run-time error information:
occurrence of the error pertaining to the first component within the first computing device during execution of run-time operations, and
a second action performed in response to the error detected during run-time;
retrieve an error policy, wherein the error policy maps the error to the first action; and
update the error policy based on the second action to provide an updated error policy.

2. The system as claimed in claim 1, wherein the updated error policy is to be applied in response to detection of the error for a second component installed within a second computing device within a distributed computing environment.

3. The system as claimed in claim 1, wherein the error policy and the first action are defined within a firmware of the first component.

4. The system as claimed in claim 1, wherein the first component is one of a hardware component and a software component within the first computing device.

5. The system as claimed in claim 1, wherein to update the error policy, the instructions executable by the processor are to add, within the error policy, a mapping between the error and the second action.

6. The system as claimed in claim 1, wherein the instructions executable by the processor are to further:
receive the run-time error information pertaining to an encountered error for a valid component within a reference computing device, wherein the run-time error information further comprises information pertaining to a run-time action performed in response to the encountered error, wherein the run-time action is similar to the second action; and
on determining the encountered error to be similar to the error, update the mapping of the error based on the second action to update the error policy.

7. The system as claimed in claim 1, wherein the error policy is a bipartite graph having the error in a first set of the bipartite graph linked with a connecting edge with one of the first action and the second action in a second set of the bipartite graph, wherein the connecting edge is associated with a weightage factor.

8. The system as claimed in claim 7, wherein to update the mapping, the instructions executable by the processor to increase the weightage factor of the mapping between the error and the second action.

9. The system as claimed in claim 1, wherein the system is communicatively coupled to the first computing device and a second computing within a distributed computing environment.

10. A method comprising:
 detecting occurrence of a current error in a component in a first computing device, during boot up;
 retrieving an error policy, wherein the error policy maps an error type with a prescribed action, and wherein the error policy is updateable based on a performed action undertaken for another computing device, to address another error similar to the current error, occurring during run-time; and
 performing a selected action from updated error policy to address the current error during the boot up.

11. The method as claimed in claim 10, wherein the component is memory component within the first computing device.

12. The method as claimed in claim 10, wherein the error policy is a bipartite graph having the error type grouped in a first set of the bipartite graph and respective prescribed action grouped in a second set of the bipartite graph.

13. The method as claimed in claim 12, wherein each of the error type is logically linked to one of the prescribed actions and the performed actions through a connecting edge.

14. The method as claimed in claim 13, wherein each of the connecting edges are associated with a weight.

15. The method as claimed in claim 10, wherein the error policy is stored within a main memory of the first computing device.

16. The method as claimed in claim 10, wherein the error policy also comprises information pertaining to a severity of the error type.

17. A non-transitory computer-readable medium comprising computer-readable instructions being executable by a processing resource to:
 retrieve an error policy from a main memory of a first computing device wherein the error policy comprises an error mapped to a boot-time action and a run-time action, each undertaken in response to detecting the error during boot up and during run-time, respectively;
 obtain run-time error information from a second computing device, wherein the run-time error information comprises:
  information of an occurred error detected during execution of run-time operations performed by the second computing device, and
  a valid action performed in response to the occurred error, wherein the occurred error is similar to the error specified in the error policy;
 update the error policy based on the valid action; and
 upon rebooting the first computing device, correct the occurrence of the error detected during boot-time based on the updated error policy.

18. The non-transitory computer-readable medium as claimed in claim 17, to update the error policy the instructions are further executable by the processing resource to map the valid action to the error in the error policy.

19. The non-transitory computer-readable medium as claimed in claim 17, to update the error policy the instructions are further executable by the processing resource to:
 determine the valid action to be similar to run-time action in the error policy; and
 based on the determining, increasing a weightage factor associated with the run-time action in the error policy.

20. The non-transitory computer-readable medium as claimed in claim 17, wherein the error policy is a bipartite graph having the error in a first set of the bipartite graph linked with connecting edges with one of the boot-time action and the run-time action grouped in a second set of the bipartite graph.

* * * * *